United States Patent [19]

Werle et al.

[11] Patent Number: 5,444,350

[45] Date of Patent: Aug. 22, 1995

[54] PROCESS FOR DETERMINING THE LOAD OF AN ASYNCHRONOUS MOTOR FED VIA A FREQUENCY CONVERTER AND A DEVICE FOR CARRYING OUT THE PROCESS

[75] Inventors: Paulo Werle; Victor M. F. B. Gettschald, both of Sao Paulo, Brazil

[73] Assignee: Icotron S.A. Industria de Componentes Electronicos, Sao Paulo, Brazil

[21] Appl. No.: 241,454

[22] Filed: May 11, 1994

Related U.S. Application Data

[63] Continuation of Ser. No. 64,147 filed as PCT/BR91/00022, Oct. 8, 1991, abandoned.

[30] Foreign Application Priority Data

Oct. 10, 1990 [BR] Brazil ................................. 9005174

[51] Int. Cl.⁶ ............................................... H02P 1/24
[52] U.S. Cl. ................................. 318/727; 318/254; 318/811; 318/798; 318/805
[58] Field of Search ................ 318/727, 811, 798, 805, 318/806, 254, 812, 807; 134/57 R, 58 R; D32/5

[56] References Cited

U.S. PATENT DOCUMENTS

| | | | |
|---|---|---|---|
| 4,491,778 | 1/1985 | Knox et al. | 318/811 |
| 4,544,868 | 10/1985 | Murty | 318/811 |
| 4,779,430 | 10/1988 | Thuruta et al. | 68/12 R |
| 5,194,797 | 3/1993 | Kahkipuro | 318/727 |
| 5,241,257 | 8/1993 | Nordby et al. | 318/811 |
| 5,250,890 | 10/1993 | Tanamachi et al. | 318/811 |

FOREIGN PATENT DOCUMENTS 3101511 8/1982 Germany .

*Primary Examiner*—William M. Shoop, Jr.
*Assistant Examiner*—Karen Masih
*Attorney, Agent, or Firm*—Beveridge, DeGrandi, Weilacher & Young

[57] ABSTRACT

In an asynchronous motor fed from an AC current network (A:Mp) via a frequency converter (5;6) and having an electronic control system (2;3) for controlling the operating voltage as a function of a comparison of a load-specific current signal, which can be detected by the electronic control system (2;3), with a corresponding control of the asynchronous motor (1) can be achieved with a low electronic expenditure by providing the current decay time ($A_1$) as a load-specific current signal during which time the free-wheeling current following after voltage interruption in a motor winding path decreases by a specific degree.

12 Claims, 3 Drawing Sheets

PROCESS FOR DETERMINING THE LOAD OF AN ASYNCHRONOUS MOTOR FED VIA A FREQUENCY CONVERTER AND A DEVICE FOR CARRYING OUT THE PROCESS

This application is a continuation of application Ser. No. 08/064,147, filed as PCT/BR91/00022, Oct. 8, 1991, now abandoned.

BACKGROUND OF THE INVENTION

The invention relates to a process for determining the load of an asynchronous motor fed via a frequency converter, and a device for carrying out this process.

German patent document A1-31 01 511 discloses a known process for determining the load of devices, in particular domestic appliances which are driven, inter alia, by an asynchronous motor and which carry out different operating programmes under different load states and in which the operating voltage of the asynchronous motor is controlled by means of an electronic control system containing a microcumputer, the load state determining the respective operating programme is determined by comparing at least one variable supplied by the electronic control system controlling the operating voltage of the asynchronous motor and at least one comparison value predetermined for the asynchronous motor; the phase difference between the operating voltage zero crossover point is used as the variable supplied by the electronic control system and the width of the pulse width signal, supplied by the electronic control system, for the power component of the converter-fed asynchronous motor is used as the manipulated value. In the known case, the zero crossover point of the operating voltage is detected by a zero crossover point detector and the zero crossover point of the operating current is detected by a Hall generator; the phase shift angle which is representative of the load is then detected by the electronic control system which is already present and required even without detection of the load.

SUMMARY OF THE INVENTION

A process which manages with a low expenditure in terms of components in comparison with the above and nevertheless ensures a reliable determination of the load is possible according to the invention.

In one respect, the invention involves a method of driving an asynchronous motor which has at least one motor winding path capable of storing magnetic energy. The method includes the following steps: using a frequency converter to supply clock pulses spaced therebetween by clock pauses, said clock pulses energizing the motor winding path of said motor; during a clock pause, generating a free-wheeling current from the magnetic energy previously stored in said motor winding path; measuring the current decay time of the free-wheeling current during a clock pause; comparing said current decay time to a predetermined reference value to obtain a comparison value; and, controlling the operating voltage of said motor as a function of said comparison value.

The invention also relates to apparatus for driving an asynchronous motor which has at least one motor winding path capable of storing magnetic energy, a frequency converter for supplying clock pulses to said motor winding path, said clock pulses energizing the motor winding path of said motor, said clock pulses being spaced therebetween by clock pauses so that said motor, during a clock pause, generates a free-wheeling current by the magnetic energy previously stored in said motor winding path; and electronic control means for doing the following:

measuring the current decay time of the free-wheeling current during a clock pause;

comparing said current decay time to a predetermined reference value to obtain a comparison value; and, controlling the operating voltage of said motor as a function of said comparison value.

Starting from the knowledge of the design—known for example from the customary equivalent circuit diagram—of an asynchronous motor with, inter alia, a main inductor and a slip-dependent ohmic rotor resistor, which is parallel thereto, according to the invention the decay time of the free-wheeling current of one phase, which decay time is different in each case depending on the slip variable and thus load variable, is utilised after the said current is disconnected from the supply voltage in order to transmit a load-specific signal to the electronic control system, which is present per se, and to use it further there for the closed-loop or open-loop control of the asynchronous motor. The expenditure in terms of components for detecting the current decay time can be kept particularly small by defining the start of the current decay time measurement by the time of the voltage interruption since this time is already defined by the electronic control system which is present per se.

The end of the current decay time is expediently defined by the time of the end of the free-wheeling current, a voltage transistor which is initially switched off or switched on being connected as voltage decay measuring element in a particularly simple manner via voltage divider resistors solely to the phase provided for the measurement, which transistor switches over when the zero point of the free-wheeling current is reached and passes on this time as time-specific variable for the end of the current decay time to the electronic control system as an actual value.

BRIEF DESCRIPTION OF THE DRAWINGS

The invention and further advantageous embodiments of the invention are explained in greater detail below with reference to an exemplary embodiment illustrated diagrammatically in the drawings, in which.

DESCRIPTION OF THE PREFERRED EMBODIMENTS

Figure 1:
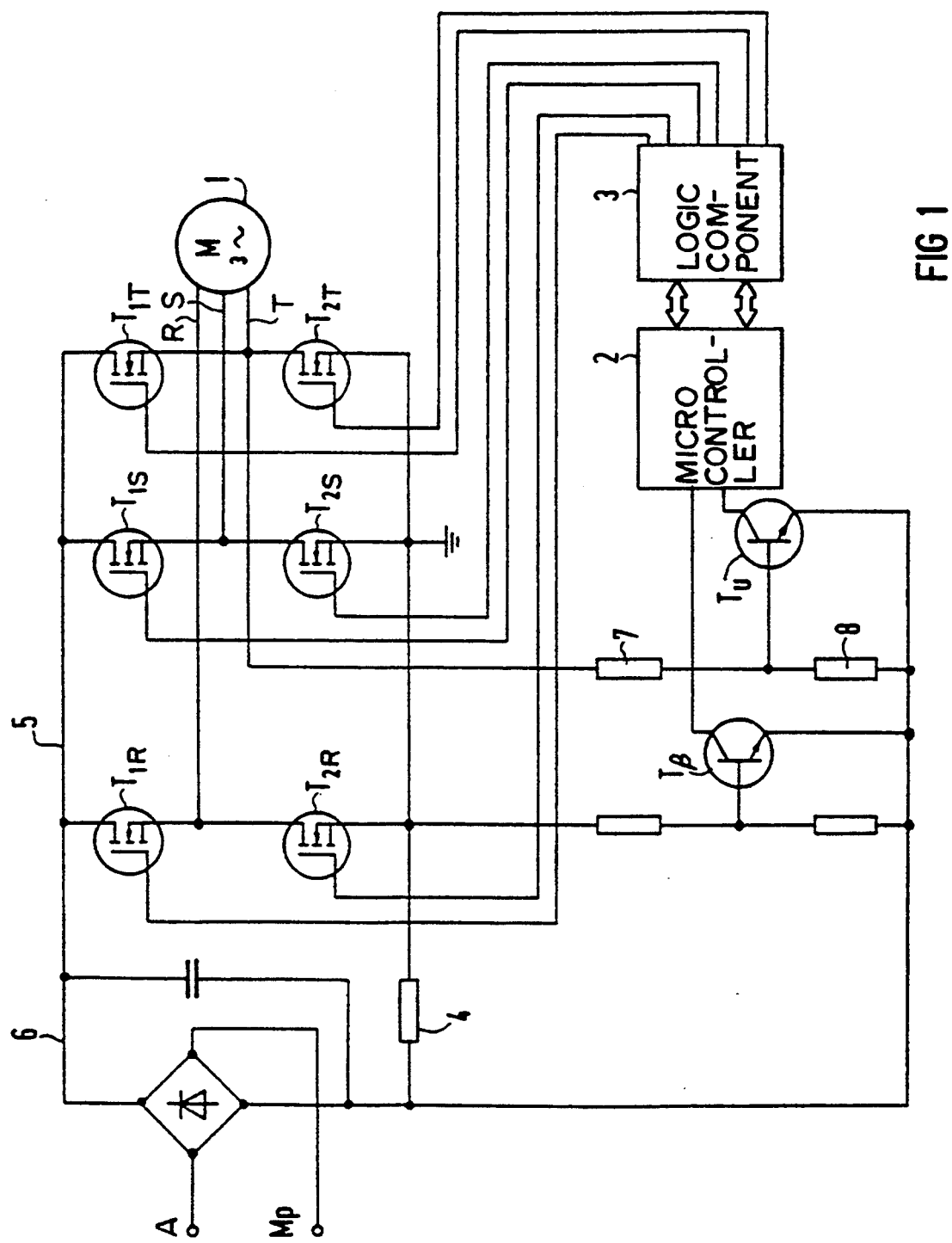
FIG. 1 shows an overall basic circuit diagram of a converter-fed asynchronous motor with current decay time detection in one phase.

FIG. 1 shows an asynchronous motor 1 fed from a single phase AC current network A;M, via a frequency converter with a three-phase bridge 5 having two transistor motor actuators ($T_{1R}$, $T_{2R}$; $T_{1S}$, $T_{2S}$; $T_{1T}$, $T_{2T}$) per phase, and via an intermediate DC circuit 6. The transistor motor actuators are identified by the reference characters $T_{1R}, T_{2R}, T_{1S}, T_{2S}, T_{1T}, T_{2T}$, wherein the subscript letters and reference characters R, S and T identify and distinguish the respective motor winding paths and phases. A detailed description of the function of the asynchronous motor, known for example from EP-A2-0 254 709 and fed via a frequency converter, can be dispensed with here; instead of the circuit with three phase-shifted voltages, such a circuit with only two-phase shifted voltages and correspondingly a total of only four transistor motor actuators in only two controlled half bridges can be provided without changing the inventive idea.

Figure 2:
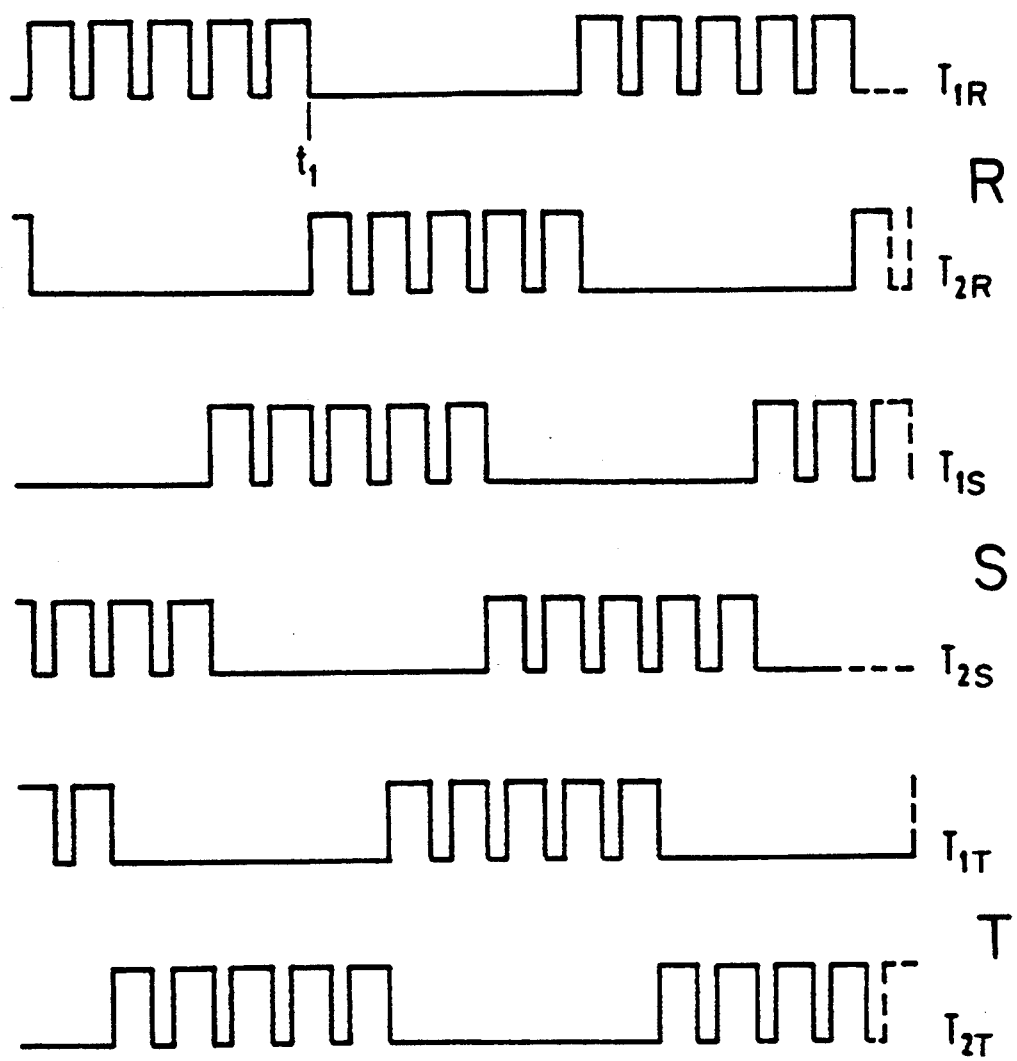
FIG. 2 shows the clocking diagram of the three phases of the asynchronous motor with non-complementary clocking.

The clocking, provided according to an embodiment of the invention, of the three phases of the asynchronous motor 1 via transistor motor actuators $T_{1R}, T_{2R}, T_{1S}, T_{2S}, T_{1T}, T_{2T}$-A; assigned in each case to each phase can be seen in FIG. 2. FIG. 2 describes a so-called non-complementary clocking in which the motor actuators of a phase do not change cyclically but rather in clocking sections of 180 electrical degrees in each case. This means that the return of the energy stored in the inductors of the motor occurs as a free-wheeling current via the completely rectified voltage.

Figure 3:
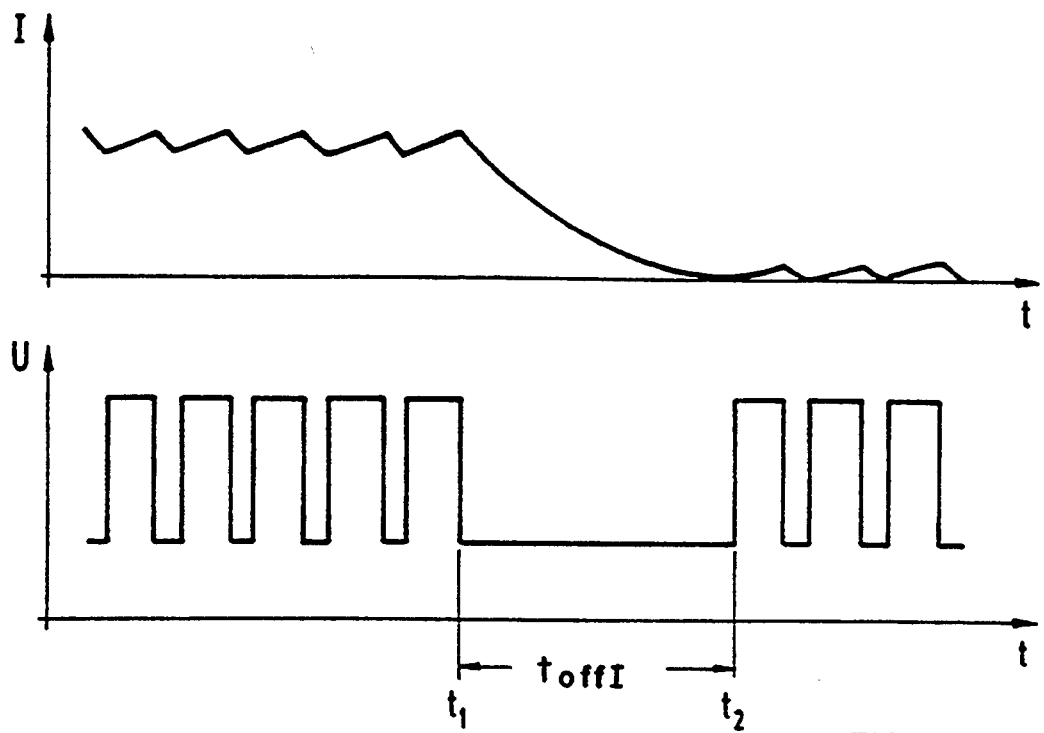
FIG. 3 shows the voltage characteristic and current characteristic of a phase with current decay time measurement with a small load.
Figure 4:
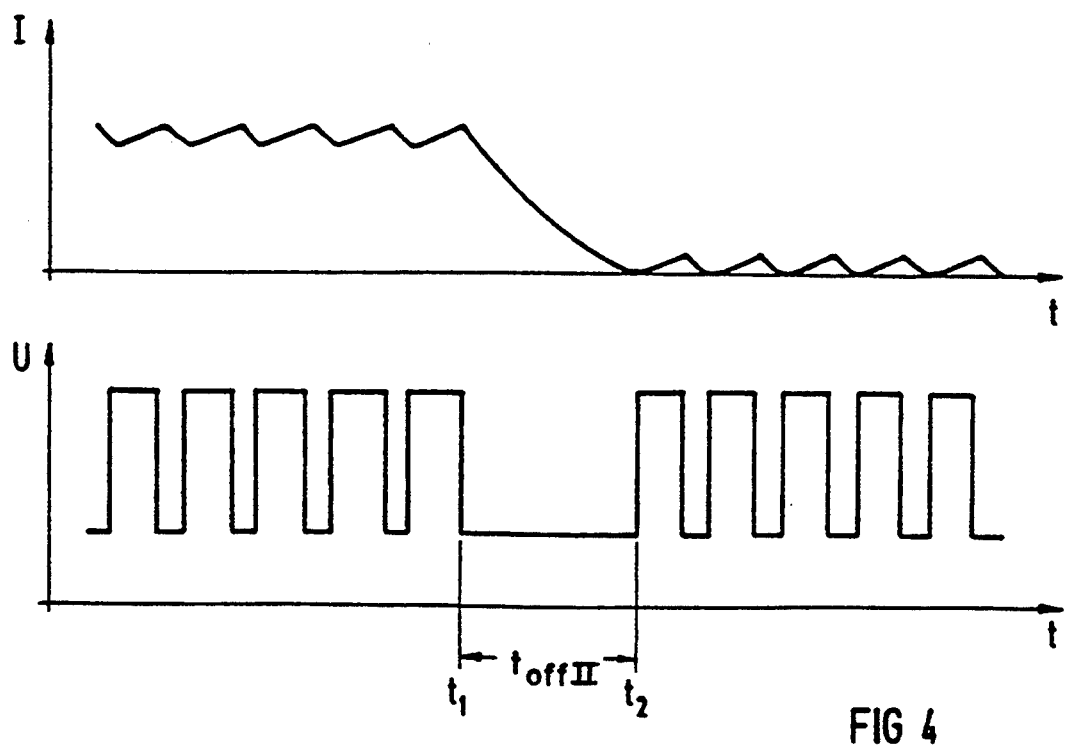
FIG. 4 shows the voltage characteristic and current characteristic of a phase with current decay time mean-surement of a large load.

The load detection according to the invention by measuring the current decay time of the free-wheeling current is described below in particular with reference to FIGS. 3 and 4.

In a zero crossover point of the phase provided for current decay time measurement, i.e. when changing over from its first transistor motor actuators $T_{1R}, T_{1S}, T_{1T}$, to its second transistor motor actuators $T_{2R}, T_{2S} T_{2T}$, or vice versa, the current of this phase returns to zero, as a function of the respective slip of the preceding load state, with a greater or lesser degree of steepness. This time is in the region of micro-seconds, for example between 50 and 1000 μs for a typical asynchronous motor provided for driving an automatic washing machine. In the idling load state the slip is zero so that the slip-dependent ohmic rotor resistance according to the equivalent circuit diagram tends towards the infinite; a relatively long current decay time $t_{offI}$ according to FIG. 3 corresponds to this. With full load and thus a large degree of slip, the slip-dependent ohmic rotor resistance tends towards a substantially smaller value so that now a corresponding shorter current decay time $t_{II}$ according to FIG. 4 represents the load state.

The clock pauses of the individual transistor motor actuators $T_{1R}, T_{2R}, T_{1S}, T_{2S}, T_{1T}, T_{2T}$ according to FIG. 2 can be used for the respective measurement of the current decay time, however, in each case the current decay time can also be measured during an interruption of the clock pulses of a clock block and after the end of the measurement the further clocking of the previously disconnected transistor motor actuator can be returned to.

By means of the switch-on times of the second and third transistors $T_{1R}$ and $T_{2R}$ which is extended in comparison with the shorter switch-on time of the first transistor, the discharge voltage is reduced whilst the discharge time is correspondingly extended.

The measurement of the current decay time or the reformation time of the voltage in a phase provided for measuring, after interruption of the clocking, occurs in an advantageous manner according to FIG. 1 with only a single voltage transistor $T_u$ between voltage divider resistors 7;8 in one current measuring path. The time $t_1$ of the start of the current decay time meansurement is known in the electronic control system by virtue of the switching over of the first transistor motor actuator $T_{1R}, T_{1S}, T_{1T}$ to the respective second transistor motor actuator $T_2$; the time $T_{2R}, T_{2S}, T_{2T}$ of the end of the current decay time measurement is signalled by the voltage transistor $T_u$ to the electronic control system 2,3 consisting at least of one microcontroller 2 and one logic component 3 by the voltage at the previously switched off or switched on voltage transistor $T_u$ now, in reverse fashion, switching on or switching off the said voltage transistor when the free-wheeling current reaches the zero point. A current transistor $T_\beta$ with voltage divider resistors and a current resistor 4, also illustrated in FIG. 1, serves solely for current limiting in a control process of the asynchronous motor, following for example due to the current decay time detection, in the case of a mechanical overload as a protection against a current overload.

The individual current decay times detected by the voltage transistor $T_u$ are expediently averaged according to known methods in order, if required, to be able to eliminate disturbing influences; the possible clock and measuring cycle times are so short that an adequate elimination of undesired load states is ensured at any time.

The load detection according to the invention which can be achieved with a low expenditure in terms of components by measuring the current decay times is used according to a first embodiment of the invention for the voltage control or speed of rotation control of the asynchronous motor as a function of undesired load states; this is provided in particular for an unbalance detection or unbalance-compensating voltage control of the asynchronous motor as a function of a current decay time deviation representing an unbalance.

The current decay time measurement according to the invention can also be advantageously used for detecting the load of the washing drum by comparing the current decay times in a first, in particular application speed of rotation of the wash with a second higher speed of rotation subsequently achieved with a constant acceleration.

We claim:

1. A method of driving an asynchronous motor which has at least one motor winding path capable of storing magnetic energy, said method including the following steps:

using a frequency converter to supply clock pulses spaced therebetween by clock pauses, said clock pulses energizing the motor winding path of said motor;

during a clock pause, generating a free-wheeling current from the magnetic energy previously stored in said motor winding path;

measuring the current decay time of the free-wheeling current during a clock pause;

comparing said current decay time to a predetermined reference value to obtain a comparison value; and, controlling the operating voltage of said motor as a function of said comparison value.

2. The method of claim 1 wherein said motor winding path is energized by blocks of clock pulses separated by clock pauses, and wherein said current decay time begins when a voltage interruption initiates a clock pause and terminates when said free-wheeling current reaches a predetermined value.

3. The method of claim 1 wherein said current decay time indicates the load state of said asynchronous motor.

4. A method according to claim 1 wherein the step of measuring the current decay time is initiated at the time ($t_1$) a clock pause is initiated, and wherein the step of measuring current decay time is terminated at a time ($t_2$) when the free-wheeling current reaches its zero crossover point.

5. A method according to claim 1 wherein there is a plurality of motor winding paths and, for each motor winding path, there is a first transistor motor actuator ($T_{1R}$, $T_{1S}$, $T_{1T}$) and a second transistor motor actuator ($T_{2R}$, $T_{2S}$, $T_{2T}$), said first transistor motor actuator and said second transistor motor actuator alternately clocking the supply voltage per phase, said step of measuring the current decay time being initiated when clocking changes from the first transistor motor actuator to the second transistor motor actuator.

6. A method according to claim 5 wherein each of the transistor motor actuators provides clocking in sections of 180 electrical degrees.

7. A method according to claim 1 including the step of controlling the speed of rotation of the motor as a function of the current decay time.

8. A method according to claim 1 wherein the method is performed in an automatic washing machine, said method including the step of detecting deviations in current decay times to determine an unbalanced condition.

9. A method according to claim 1 wherein the method is performed in an automatic washing machine which has a washing drum, said method including the steps of accelerating the washing drum from a constant first speed of rotation to a second speed of rotation, and detecting the washing load by comparing the current decay times at said first speed of rotation with the current decay times at said second speed of rotation.

10. Apparatus for driving an asynchronous motor which has at least one motor winding path capable of storing magnetic energy, comprising, a frequency converter for supplying clock pulses to said motor winding path, said clock pulses energizing the motor winding path of said motor, said clock pulses being spaced therebetween by clock pauses so that said motor, during a clock pause, generates a free-wheeling current by the magnetic energy previously stored in said motor winding path; and electronic control means for:

measuring the current decay time of the free-wheeling current during a clock pause;

comparing said current decay time to a predetermined reference value to obtain a comparison value; and, controlling the operating voltage of said motor as a function of said comparison value.

11. Apparatus according to claim 10 wherein the electronic control means includes a microcontroller and a current decay measuring element for measuring the free-wheeling current, said measuring element being connected to at least one said motor winding path, said measuring element being activated after voltage is interrupted on its respective motor winding path and being deactivated after the free-wheeling current has decreased by a specific amount.

12. Apparatus according to claim 10 further comprising switching voltage means connected to said motor winding path and wherein said current decay time indicates the load state of said asynchronous motor.

* * * * *